(12) United States Patent
Kim et al.

(10) Patent No.: US 8,838,676 B2
(45) Date of Patent: Sep. 16, 2014

(54) METHOD AND APPARATUS FOR DISCOVERING INTERNET PROTOCOL TELEVISION SERVICE (IPTV) PROVIDER AND IPTV SERVICE BY USING SESSION INITIATION PROTOCOL

(75) Inventors: Mun-jo Kim, Suwon-si (KR); Eun-hee Rhim, Yongin-si (KR); In-chul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 12/323,785

(22) Filed: Nov. 26, 2008

(65) Prior Publication Data

US 2009/0138923 A1 May 28, 2009

Related U.S. Application Data

(60) Provisional application No. 60/990,398, filed on Nov. 27, 2007, provisional application No. 61/030,311, filed on Feb. 21, 2008.

(30) Foreign Application Priority Data

Nov. 18, 2008 (KR) .................. 10-2008-0114750

(51) Int. Cl.
*G06F 15/16* (2006.01)
*H04L 29/08* (2006.01)
*H04L 29/06* (2006.01)
*H04N 21/643* (2011.01)

(52) U.S. Cl.
CPC ............ *H04L 65/4076* (2013.01); *H04L 67/16* (2013.01); *H04N 21/64322* (2013.01); *H04L 65/1006* (2013.01)

USPC .......................................... 709/203; 709/227

(58) Field of Classification Search
USPC .................................................. 709/203, 231
See application file for complete search history.

(56) References Cited

U.S. PATENT DOCUMENTS

| | | | |
|---|---|---|---|
| 7,188,179 B1 * | 3/2007 | Hanson et al. ................ 709/227 |
| 7,213,062 B1 * | 5/2007 | Raciborski et al. ........... 709/223 |
| 7,353,295 B1 * | 4/2008 | Crow et al. ................... 709/245 |
| 2002/0143819 A1 * | 10/2002 | Han et al. ...................... 707/513 |
| 2003/0005132 A1 * | 1/2003 | Nguyen et al. ............... 709/229 |
| 2003/0079020 A1 | 4/2003 | Gourraud et al. |
| 2004/0003058 A1 * | 1/2004 | Trossen ......................... 709/220 |
| 2004/0015405 A1 * | 1/2004 | Cloutier et al. ................. 705/26 |

(Continued)

FOREIGN PATENT DOCUMENTS

| | | |
|---|---|---|
| CN | 1490959 A | 4/2004 |
| CN | 1852319 A | 10/2006 |

(Continued)

OTHER PUBLICATIONS

Handley, SDP: Session Description Protocol, RFC 2327, Apr. 1998.*

(Continued)

*Primary Examiner* — Emmanuel L Moise
*Assistant Examiner* — Robert Shaw
(74) *Attorney, Agent, or Firm* — Sughrue Mion, PLLC

(57) ABSTRACT

Provided are a method and apparatus by which a first entity receives information about one or more Internet Protocol Television (IPTV) service providers or information about one or more IPTV services from a second entity by using a Session Initiation Protocol (SIP) message.

25 Claims, 12 Drawing Sheets

(56) References Cited

U.S. PATENT DOCUMENTS

| | | | |
|---|---|---|---|
| 2004/0128344 A1* | 7/2004 | Trossen | 709/203 |
| 2004/0255302 A1* | 12/2004 | Trossen | 719/318 |
| 2005/0015499 A1* | 1/2005 | Mayer | 709/228 |
| 2005/0042983 A1* | 2/2005 | Borgward | 455/3.06 |
| 2005/0111441 A1* | 5/2005 | Koskelainen | 370/352 |
| 2006/0004924 A1* | 1/2006 | Trossen | 709/228 |
| 2006/0031522 A1 | 2/2006 | Soulhi et al. | |
| 2006/0052087 A1* | 3/2006 | Tuunanen et al. | 455/414.1 |
| 2006/0123116 A1* | 6/2006 | Rahman et al. | 709/227 |
| 2006/0129646 A1 | 6/2006 | Rhee et al. | |
| 2006/0248570 A1* | 11/2006 | Witwer | 725/135 |
| 2007/0055783 A1* | 3/2007 | Gourraud | 709/227 |
| 2007/0143502 A1* | 6/2007 | Garcia-Martin et al. | 709/246 |
| 2007/0157247 A1* | 7/2007 | Cordray et al. | 725/47 |
| 2007/0165613 A1 | 7/2007 | Soo et al. | |
| 2007/0208804 A1* | 9/2007 | Fornies et al. | 709/203 |
| 2007/0258111 A1 | 11/2007 | Ooizumi | |
| 2007/0288478 A1* | 12/2007 | DiMaria et al. | 707/10 |
| 2008/0127255 A1* | 5/2008 | Ress et al. | 725/38 |
| 2008/0141306 A1* | 6/2008 | Foti | 725/44 |
| 2008/0256232 A1* | 10/2008 | Fleury et al. | 709/224 |
| 2008/0263212 A1* | 10/2008 | Goix et al. | 709/228 |
| 2009/0055879 A1 | 2/2009 | Wang et al. | |
| 2009/0106768 A1* | 4/2009 | Ramanathan et al. | 719/311 |
| 2009/0222514 A1 | 9/2009 | Igarashi | |
| 2009/0235299 A1* | 9/2009 | Astrom et al. | 725/25 |
| 2009/0307307 A1* | 12/2009 | Igarashi | 709/203 |
| 2011/0182205 A1* | 7/2011 | Gerdes et al. | 370/254 |

FOREIGN PATENT DOCUMENTS

| | | | | |
|---|---|---|---|---|
| CN | 1968402 A | | 5/2007 | |
| KR | WO 2008/084965 | * | 7/2008 | |
| WO | WO 2004/059502 | * | 12/2003 | G06F 15/16 |
| WO | 2007/102550 A1 | | 9/2007 | |

OTHER PUBLICATIONS

Rosenberg et al., SIP: Session Initiation Protocol, RFC 3261, Jun. 2002.*

Roach, Session Initiation Protocol (SIP)-Specific Event Notification, RFC 3265, Jun. 2002.*

Handley et al, SDP: Session Description Protocol, RFC 2327, Apr. 1998.*

Jun et al An IMS-Based Service Platform for the Next-Generation Wireless Networks, IEEE Communications Magazine, Sep. 2006.*

DVB Transport of MPEG 2 Transport Stream (TS) Based DVB Services over IP Based Networks, A086 Rev. 6 (Sep. 2007).*

ETSI, IPTV architecture: Dedicated subsystem for IPTV functions in NGN, ETSI DTS 02049 V0.0.6 (May 2007).*

Delgado, "Implementation and Evaluation of the Service Peer Discovery Protocol" MS Thesis, KTH Microelectronics and Information Technology, Stockholm, Sweden (2004).*

Chatras et al, Delivering Quadruple Play with IPTV over IMS, in Proceedings of the 11th International Conference on Intelligence in Service Delivery Networks (ICIN '07), Bordeaux, France, Oct. 2007.*

D. Petrie, A Framework for Session Initiation Protocol User Agent Profile Delivery, draft-ietf-sipping-config-framework-09.txt, (Oct. 3, 2006).*

DVB Transport of MPEG 2 Transport Stream (TS) Based DVB Services over IP Based Networks, A086 (Sep. 2007) ("DVB-IP")).*

ETSI, IPTV architecture: Dedicated subsystem for IPTV functions in NGN, ETSI DTS 02049 V0.0.6 (May 2007) ("IPTV-NGN").*

RFC 3265—Session Initiation Protocol (SIP)—Specific Event Notification, Jun. 2002.*

RFC 2782—DNS SRV, Feb. 2000.*

RFC 2608—SLP Service Location Protocol, Jul. 1999.*

RFC 3863—PIDF, Aug. 2004.*

Trossen et al, Service Discovery & Availability Subscriptions Using the SIP Event Framework, ICC 2005, IEEE (2005), pp. 1572-1577.*

Zhao et al., "Remote Service Discovery in the Service Location Protocol via DNS SRV", Internet Draft (2004).*

Liscano et al, Integrating Service Discovery Protocols with Presence-based Communications, Second Annual Conference on Communication Networks and Services Research (CNSR'04), IEEE (2004).*

Communication dated Sep. 7, 2012, issued by the State Intellectual Property Office of P.R. China in counterpart Chinese Patent Application No. 200880116336.7.

Communication from the Mexican Patent Office dated Nov. 1, 2012, in a counterpart application No. MX/a/2010/005569..

Communication dated Apr. 8, 2014 issued by the European Patent Office in counter European Patent Application No. 08853502.6.

MOTOROLA; Extending the Service Discovery Event Package Definition (Option1); ETSI TISPAN#15Bis; Sophia Antipolis; Oct. 29, 2007; pp. 1-7 XP014143445.

MOTOROLA; "WI 2048 Proposal for Sip based Service Attachment Procedure"; ETSI TISPAN#13Bis; Sophia Antipolis; Mar. 19, 2007; pp. 1-5; XP014138510.

Telecommunication and Internet Converged Services and Protocols for Advanced Networking (TISPAN); IMS based IPTA Stage 3 Specification; ETSI TS 183 063 V0.0.2; Sep. 5, 2007; pp. 1-15; XP014056725.

Open IPTV Forum - Functional Architecture—V 1.0; Open Iptv Forum Confidential Copyright 2007 Members of the Open IPTV Forum. http://www.oipf.tv/docs/OIPF-T1-R1-Functional Architecture-V1_0-2007-09-20.pdf; Sep. 20, 2007; 103 pgs.; XP55094424.

* cited by examiner

FIG. 3A

SUBSCRIBE sip:joe@example.com SIP/2.0

Via: SIP/2.0/UDP pc34.example.com;branch=z9hG4bKnashds7

From: sip:joe@example.com;tag=123aa9

To: sip:joe@example.com

Call-ID: 9987@pc34.example.com

CSeq: 9887 SUBSCRIBE

Contact: sip:joe@pc34.example.com

Event: ua-profile;profile-type="application-oif-spdlists-request";DomainName="ALL";auid="org.openiptvforum.spdlists";document="org.openopeniptvforum.spdlists/users/sip:joe.bloggs@example.com/joebloggs_friends/" ────30

Accept-Encoding: gzip ────31

Max-Forwards: 70

FIG. 3B

SUBSCRIBE sip:joe@example.com SIP/2.0

Via: SIP/2.0/UDP pc34.example.com;branch=z9hG4bKnashds7

From: sip:joe@example.com;tag=123aa9

To: sip:joe@example.com

Call-ID: 9987@pc34.example.com

CSeq: 9887 SUBSCRIBE

Contact: sip:joe@pc34.example.com

Event: oif-spdlist;DomainName="telecomitalia.com" —32

Accept-Encoding: gzip —33

Max-Forwards: 70

FIG. 4A

SUBSCRIBE sip:joe@example.com SIP/2.0

Via: SIP/2.0/UDP pc34.example.com;branch=z9hG4bKnashds7

From: sip:joe@example.com;tag=123aa9

To: sip:joe@example.com

Call-ID: 9987@pc34.example.com

CSeq: 9887 SUBSCRIBE

Contact: sip:joe@pc34.example.com

"ALL";auid="Event: ua-profile;profile-type="application-oif-sdnslsts-request";DomainName=
org.openiptvforum.sdnslists";
document="org.openopeniptvforum.sdnslists/Users/sip:joe.bloggs@example.com/joebloggs_friends/"

Accept-Encoding: gzip

Max-Forwards: 70

FIG. 4B

SUBSCRIBE sip:joe@example.com SIP/2.0

Via: SIP/2.0/UDP pc34.example.com;branch=z9hG4bKnashds7

From: sip:joe@example.com;tag=123aa9

To: sip:joe@example.com

Call-ID: 9987@pc34.example.com

CSeq: 9887 SUBSCRIBE

Contact: sip:joe@pc34.example.com

Event: oif-sdnslist;DomainName="telecomitalia.com"

Accept-Encoding: gzip

Max-Forwards: 70

FIG. 5A

NOTIFY sip:joe@pc34.example.com SIP/2.0

Via: SIP/2.0/UDP server19.example.com;branch=z9hG4bKnasaii

From: sip:joe@example.com;tag=xyzygg

To: sip:joe@example.com;tag=123aa9

Call-ID: 9987@pc34.example.com

CSeq: 1288 NOTIFY

Contact: sip:server19.example.com

Event: ua-profile;profile-type="application-oif-spdlists-request";version="1";effective-by="0"; cursection="1";lastsection="1"  —50

Subscription-State: active

Content-Encoding: gzip —51

Content-Type: application/oiptvf-iptvSPdiscovery+xml —52

Max-Forwards: 70

Content-Length: ...

[XML Document in gzip format]

FIG. 5B

NOTIFY sip:joe@pc34.example.com SIP/2.0

Via: SIP/2.0/UDP server19.example.com;branch=z9hG4bKnasaii

From: sip:joe@example.com;tag=xyzygg

To: sip:joe@example.com;tag=123aa9

Call-ID: 9987@pc34.example.com

CSeq: 1288 NOTIFY

Contact: sip:server19.example.com

Event: oif-spdlist;version="1";effective-by="0";cursection="1";lastsection="1"   /53

Subscription-State: active

Content-Encoding: gzip

Content-Type: application/oiptvf-iptvSPdiscovery+xml

Max-Forwards: 70

Content-Length: ...

[XML Document in gzip format]

FIG. 6A

NOTIFY sip:joe@pc34.example.com SIP/2.0

Via: SIP/2.0/UDP server19.example.com;branch=z9hG4bKnasaii

From: sip:joe@example.com;tag=xyzygg

To: sip:joe@example.com;tag=123aa9

Call-ID: 9987@pc34.example.com

CSeq: 1288 NOTIFY

Contact: sip:server19.example.com

Event: ua-profile;profile-type="application-oif-sdnslists-request";payload="02";version="1";effective-by="0"; cursection="1";lastsection="1"

Subscription-State: active

Content-Encoding: gzip

Content-Type: application/oiptvf-iptvServicediscovery+xml

Max-Forwards: 70

Content-Length: ...

[XML Document in gzip format]

FIG. 6B

NOTIFY sip:joe@pc34.example.com SIP/2.0

Via: SIP/2.0/UDP server19.example.com;branch=z9hG4bKnasaii

From: sip:joe@example.com;tag=xyzygg

To: sip:joe@example.com;tag=123aa9

Call-ID: 9987@pc34.example.com

CSeq: 1288 NOTIFY

Contact: sip:server19.example.com

Event: oif-sdnslist;version="1";payload="02";effective-by="0";cursection="1";lastsection="1"

Subscription-State: active

Content-Encoding: gzip

Content-Type: application/oiptvf-iptvServicediscovery+xml

Max-Forwards: 70

Content-Length: ...

[XML Document in gzip format]

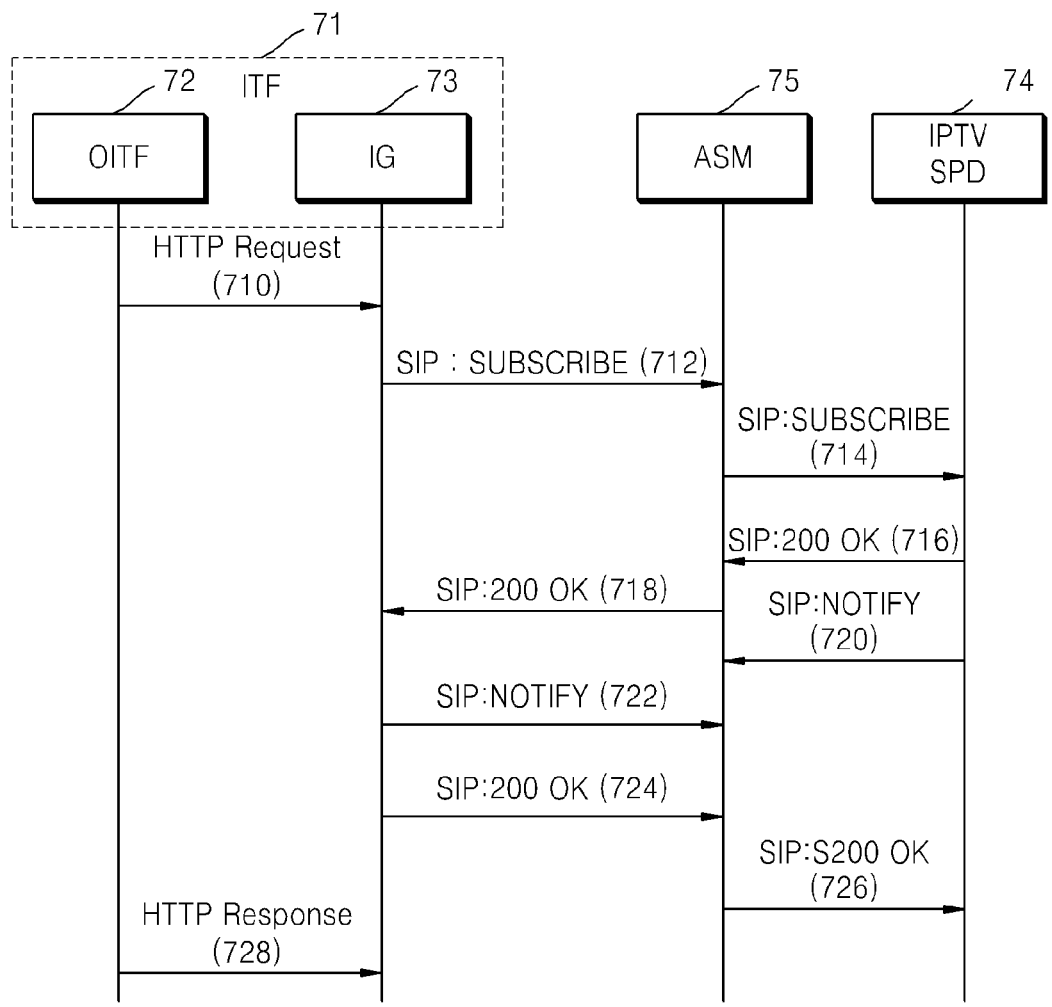

METHOD AND APPARATUS FOR DISCOVERING INTERNET PROTOCOL TELEVISION SERVICE (IPTV) PROVIDER AND IPTV SERVICE BY USING SESSION INITIATION PROTOCOL

CROSS-REFERENCE TO RELATED PATENT APPLICATION

This application claims the benefit of Korean Patent Application No. 10-2008-0114750, filed on Nov. 18, 2008, in the Korean Intellectual Property Office, and U.S. provisional Patent Application No. 60/990,398, filed on Nov. 27, 2007, and U.S. Provisional Patent Application No. 61/030,311, filed on Feb. 21, 2008, in the U.S. Patent and Trademark Office, and the disclosures of which are incorporated herein their entirety by reference.

BACKGROUND OF THE INVENTION

1. Field of the Invention

The present invention relates to a method and apparatus for transmitting and receiving information about a service provider or information about a service.

2. Description of the Related Art

An Internet Protocol Television (IPTV) corresponds to a service that delivers various services including an information service, a moving picture contents and broadcasting contents service, and the like to TVs via an IP network, that is, a high speed Internet network infrastructure. With the development of communication and broadcasting convergence services, there is increasing interest in the IPTV, and in this regard, it is expected that such activeness related to the IPTV will have a significant effect on not only communication and broadcasting industries but also on multimedia contents and electronic device industries.

According to the related art, in order to receive an IPTV service via an IP network, an IPTV service user needs to arrange a set-top box or any apparatus including the set-top box function that varies according to IPTV vendors. That is, only a user, who has an IPTV set-top box manufactured according to a specification set by a service provider providing an IPTV service, can receive the IPTV service from the service provider. For example, in the case where three IPTV service providers such as A, B, and C companies provide IPTV services, a service user, who purchased a set-top box of the A company, can only use an IPTV service from the A company. Hence, in order to use an IPTV service from the B or C company, the service user has to separately arrange a set-top box of the B or C company. Such a compatibility problem between an IPTV service and set-top boxes makes selection difficult for service users, and as a result, this compatibility problem deteriorates IPTV services quality or becomes an obstacle to the spread of IPTV services.

In order to solve this compatibility problem, recently, the Open IPTV Forum was established to discuss standardization. Members of the Open IPTV Forum have been in discussion to release a common specification independent from IPTV service providers and to provide IPTV services based on such a common specification to users who desire to use IPTV services.

The Open IPTV Forum aims to develop an interface and a hardware platform which are independent from the IPTV service providers, so as to allow a user to easily use IPTV services provided from the IPTV service providers. According to an Open IPTV forum architecture, a user may use services provided from different IPTV service providers, without separately arranging set-top boxes that vary according to the IPTV service providers, whereby service users may have a wider range of options with respect to selecting services.

SUMMARY OF THE INVENTION

The present invention provides a method and apparatus for transmitting and receiving information about one or more service providers and information about one or more services, and also provides a computer readable recording medium having recorded thereon a program for executing the method.

According to an aspect of the present invention, there is provided a method of receiving information about one or more service providers from a second entity, which is performed by a first entity, the method including the operations of generating a first Session Initiation Protocol (SIP) message requesting information about one or more service providers providing a service; transmitting the first SIP message to the second entity; and as a response to the first SIP message, receiving a second SIP message comprising the information about the one or more service providers from the second entity.

The service may include an Internet Protocol Television (IPTV) service.

The first SIP message may include a SIP SUBSCRIBE message requesting information about one or more IPTV service providers.

The second SIP message may include a SIP NOTIFY message comprising information about one or more IPTV service providers.

According to another aspect of the present invention, there is provided a method of providing information about one or more service providers to a first entity, which is performed by a second entity, the method including the operations of receiving a first SIP message requesting information about one or more service providers providing a service; as a response to the first SIP message, generating a second SIP message comprising the information about the one or more service providers; and transmitting the second SIP message to the first entity.

According to another aspect of the present invention, there is provided an information receiving apparatus of a first entity receiving information about one or more service providers from a second entity, the information receiving apparatus including a message generating unit generating a first SIP message requesting information about one or more service providers providing a service; a message transmitting unit transmitting the first SIP message to the second entity; and a message receiving unit receiving a second SIP message comprising the information about the one or more service providers from the second entity, as a response to the first SIP message.

According to another aspect of the present invention, there is provided an information providing apparatus of a second entity providing information about one or more service providers to a first entity, the information providing apparatus including a message receiving unit receiving a first SIP message requesting information about one or more service providers providing a service; a message generating unit generating a second SIP message comprising the information about the one or more service providers, as a response to the first SIP message; and a message transmitting unit transmitting the second SIP message to the first entity.

According to another aspect of the present invention, there is provided a computer readable recording medium having recorded thereon a program for executing the method of receiving and providing information.

BRIEF DESCRIPTION OF THE DRAWINGS

The above and other features and advantages of the present invention will become more apparent by describing in detail exemplary embodiments thereof with reference to the attached drawings in which:

FIGS. 3A and 3B are diagrams of SIP SUBSCRIBE messages, according to an embodiment of the present invention;

FIGS. 4A and 4B are diagrams of SIP SUBSCRIBE messages, according to another embodiment of the present invention;

FIGS. 5A and 5B are diagrams of SIP NOTIFY messages, according to an embodiment of the present invention;

FIGS. 6A and 6B are diagrams of SIP NOTIFY messages, according to another embodiment of the present invention;

FIG. 7 is a flowchart of a method of searching for information about a service provider, according to another embodiment of the present invention;

DETAILED DESCRIPTION OF THE INVENTION

The present invention will now be described more fully with reference to the accompanying drawings, in which exemplary embodiments of the invention are shown.

Figure 1:
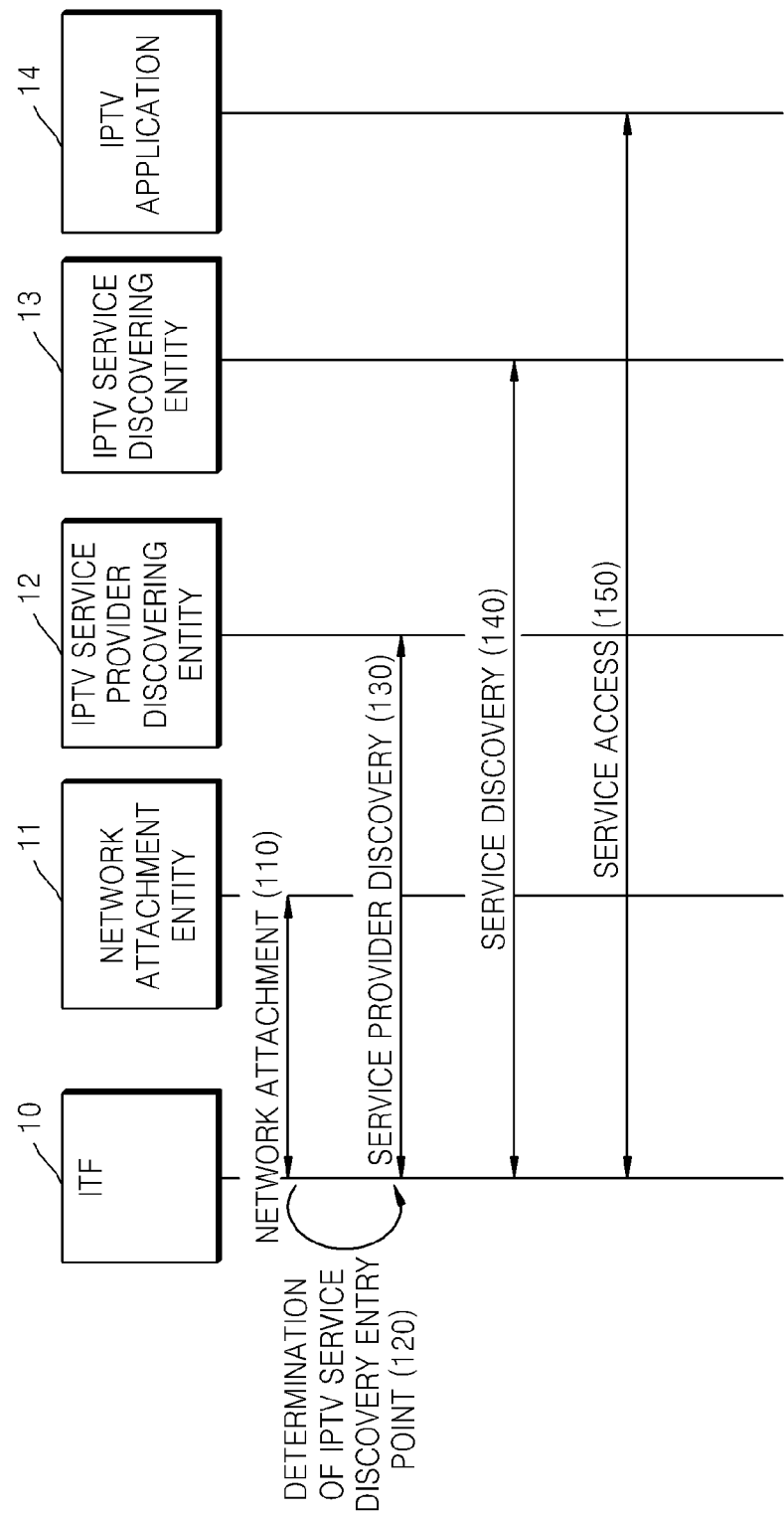
FIG. 1 is a flowchart of a service providing method using a method of searching for information about a service provider or information about a service, according to an embodiment of the present invention.

FIG. 1 is a flowchart of a service providing method using a method of searching for information about a service provider or information about a service according to an exemplary embodiment of the present invention.

The flowchart of FIG. 1 corresponds to a case in which one or more Internet Protocol TV (IPTV) service providers provide predetermined IPTV services to a user terminal, that is, an IPTV Terminal Function (ITF) entity 10. However, it will be understood by one of ordinary skill in the art that one or more embodiments to be described below may be applied to not only an IPTV service providing method but also to other service providing methods.

In operation 110, the ITF entity 10 forms an IPTV network with a network attachment entity 11. The ITF entity 10 obtains an IP address from the network attachment entity 11, thereby forming the IPTV network. The network attachment entity 11 manages a network connection, and performs user authentication and an access configuration according to a network level. The network attachment entity 11 may include a wide area network (WAN) gateway. The ITF entity 10 may be a group of a plurality of entities corresponding to domains of users who receive and use an IPTV service from an IPTV service provider.

In operation 120, the ITF entity 10 determines an entry point used in a discovery of an IPTV service. Before discovering the IPTV service, the ITF entity 10 has to first discover an IPTV service provider. Thus, in operation 120, the ITF entity 10 determines the entry point such as an IP address of an IPTV service provider discovering entity 12. Information about the IP address of the IPTV service provider discovering entity 12 may be transmitted from the network attachment entity 11 during the formation of the IPTV network, or the ITF entity 10 may have the information about the IP address without having to externally receive it.

In operation 130, the ITF entity 10 accesses the IPTV service provider discovering entity 12, and searches for information about one or more IPTV service providers. It may be possible to discover the one or more IPTV service providers that are different from each other by using one ITF entity 10, that is, one user terminal.

The information about the one or more IPTV service providers may include information about a Uniform Resource Identifier (URI) regarding an IPTV service discovering entity 13, information about a protocol required when information about IPTV services is transmitted and received, and the like. Also, the information about the one or more IPTV service providers may include information about a user interface (UI) used by a user of the ITF entity 10 when the user selects an IPTV service provider from among the one or more IPTV service providers. For example, information related to the UI, such as logos, trademarks, or icons, which are of the one or more IPTV service providers, is provided to the ITF entity 10 so that the ITF entity 10 may display the UI related information to the user, and the user of the ITF entity 10 may select one of the one or more IPTV service providers.

Since the information about the one or more IPTV service providers is provided to the ITF entity 10 via the IPTV service provider discovering entity 12, the user may select the IPTV service provider from among the one or more IPTV service providers so as to use a service of the selected IPTV service provider. By doing so, the aforementioned compatibility problem according to the related art may be solved.

In operation 140, the ITF entity 10 discovers an IPTV service of the IPTV service provider, based on the information about the IPTV service discovering entity 13 received in operation 130. When the user selects the IPTV service provider from among the one or more IPTV service providers in operation 130, the ITF entity 10 accesses the IPTV service discovering entity 13 according to an URI address of the IPTV service discovering entity 13 of the selected IPTV service provider, and discovers the IPTV service.

In operation 150, the ITF entity 10 accesses an IPTV application entity 14, and receives the IPTV service. Hereinafter, a method using a Session Initiation Protocol (SIP) message, which is a method related to the discovery of the IPTV service provider in operation 130 and the discovery of the IPTV service in operation 140, will be described in detail.

Figure 2:
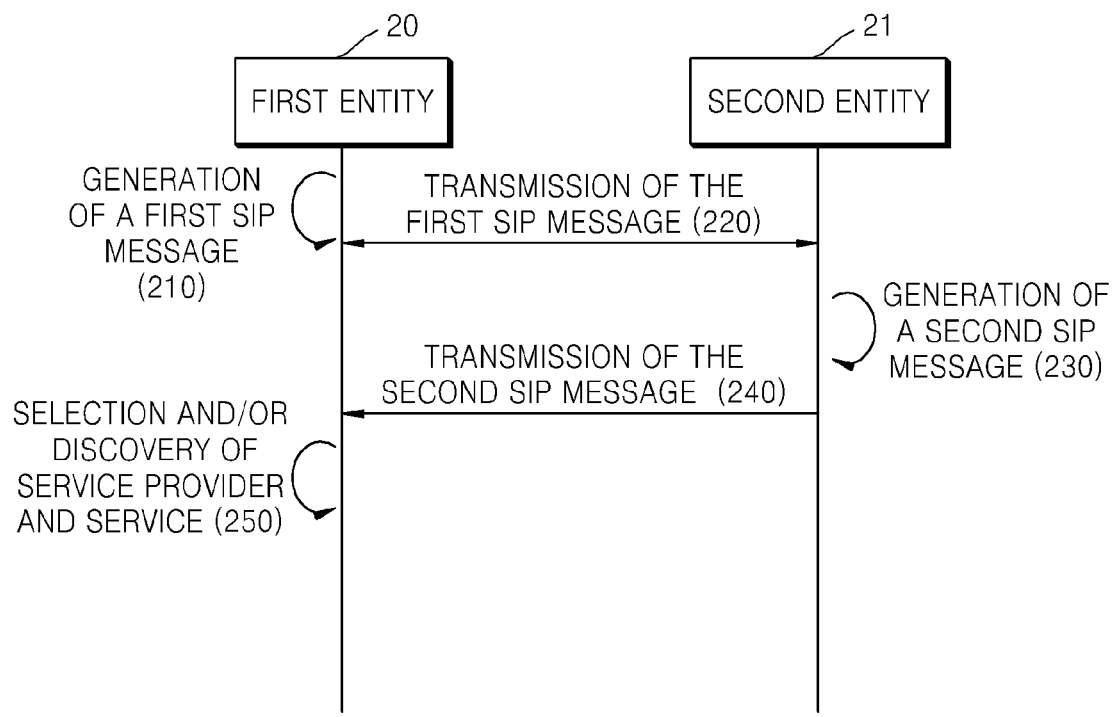
FIG. 2 is a flowchart of a method of searching for information about a service provider or about a service, according to another embodiment of the present invention.

FIG. 2 is a flowchart of a method of searching for information about a service provider or about a service according to another embodiment of the present invention.

The flowchart of FIG. 2 corresponds to a case in which a first entity 20 receives information about one or more service providers or about one or more services from a second entity 21 by using a SIP message. Similar to the case of FIG. 1, the one or more service providers may be IPTV service providers, and the one or more services may be IPTV services.

In operation 210, the first entity 20 generates a first SIP message requesting information about one or more service providers or about one or more services. A SIP is an application layer control protocol that is used when generating, changing, and ending a multimedia session or a call in an IP-based network. According to the embodiment of FIG. 2, the first SIP message may be generated by using a SIP SUB- SCRIBE message, and this SIP SUBSCRIBE message will be described in detail with reference to FIGS. 3A, 3B, 4A, and 4B.

FIGS. 3A and 3B are diagrams of SIP SUBSCRIBE messages, according to an embodiment of the present invention.

The SIP SUBSCRIBE message is one of SIP extension methods, and is used to request a remote entity for a current status or for a status update. The SIP SUBSCRIBE message includes an event header, and this event header includes parameters defined by a predetermined event package.

Referring to FIGS. 3A and 3B, the SIP SUBSCRIBE messages according to the current embodiment include event headers 30 and 32 which request information about one or more service providers.

Referring to FIG. 3A, the event header 30 of the SIP SUBSCRIBE message requesting the information about the one or more service providers may be expressed according to a conventional event package. In accordance with an exemplary embodiment of the present invention, the event header 30 may be expressed according to an ua-profile event package that is a conventional event package. A plurality of parameters related to a discovery of the one or more service providers are added to extend the ua-profile event package, and the event header 30 requesting the information about the one or more service providers according to the extended ua-profile event package may be expressed.

A "ua-profile" parameter indicates that the event header 30 is expressed according to the ua-profile event package.

A "profile-type" parameter indicates a type of a profile, wherein the first entity 20 requests the second entity 21 for the type of the profile.

Profile-type="application=oif-spdlists-request" indicates that the first entity 20 requests the second entity 21 for the information about the one or more service providers.

A "DomainName" parameter indicates types of the one or more service providers whose information is requested by the first entity 20. As illustrated in FIG. 3A, in the case of DomainName="ALL", the first entity 20 requests information about all service providers included in the second entity 21. On the other hand, in the case of DomainName="telecomitalia.com", a user of the first entity 20 desires to receive a specific service provided from a service provider having a domain address of "telecomitalia.com".

An "auid" parameter is used to identify an application of the second entity 21 that provides the information about the one or more service providers. Thus, in the case of auid="org.openiptvforum.spdlists", an identifier (ID) of the application of the second entity 21 providing the information about the one or more service providers is "org.openiptvforum.spdlists".

A "document" parameter indicates that information about service providers included in a predetermined group is requested. Thus, in the case of document="org.open-openiptvforum.spdlists/users/sip:joe./joebloggs_friends/", only information about service providers included in a "/joebloggs_friends/" group is requested.

An Accept-Encoding header 31 indicates an encoding format used to encode the information about the one or more service providers. In the case of Accept-Ecoding: gzip, the first entity 20 may receive and decode information about a service provider, wherein this information has been encoded by using an Extensible Markup Language (XML) document compression format referred to as "gzip". The information about one or more service providers may be provided to the first entity 20, as an XML document that is not compressed. However, the XML document may be compressively encoded according to various compression algorithms such as "gzip" or the like, and then may be provided to the first entity 20. Thus, information about the compression algorithms is included in the SIP SUBSCRIBE message so that the first entity 20 may perform a decoding operation by referring to the compression algorithms.

Referring to FIG. 3B, the event header 32 of a SIP SUBSCRIBE message requesting information about one or more service providers is expressed according to a separate event package defined to express an event header requesting the information about the one or more service providers.

An "oif-spdlist" parameter indicates that the event header 32 is expressed according to an oif-spdlist event package that is a new event package.

A "DomainName" parameter and an Accept-Encoding header 33 are the same as the "DomainName" parameter and the Accept-Encoding header 31 in FIG. 3A.

FIGS. 4A and 4B are diagrams of SIP SUBSCRIBE messages, according to another embodiment of the present invention.

Referring to FIG. 4A, an event header of the SIP SUBSCRIBE message requesting information about one or more services may be expressed according to a conventional event package. That is, the event header is expressed by using the ua-profile event package that is a conventional event package. Although some parameters in the embodiment of FIG. 4A are different from those in the embodiment of FIG. 3A, the event header of the SIP SUBSCRIBE message is expressed according to an event package extended from the ua-profile event package that is a conventional event package, which is the same as the embodiment of FIG. 3A.

Referring to FIG. 4B, an event header of a SIP SUBSCRIBE message requesting information about one or more services is expressed according to a separate event package defined to express an event header requesting the information about the one or more services. According to the newly defined event package referred to as "oif-sdnslist", a header of a SIP NOTIFY message requesting the information about the one or more services is expressed.

Referring back to FIG. 2, when the first SIP message corresponding to one of those illustrated in FIGS. 3A, 3B, 4A, and 4B is generated in operation 210, the first entity 20 transmits the first SIP message to the second entity 21 in operation 220.

In operation 230, the second entity 21 generates a second SIP message in response to the first SIP message received in operation 220. The second entity 21 generates the second SIP message including the information about the one or more service providers or the information about the one or more services. According to the embodiment of FIG. 2, the second SIP message may be generated by using the SIP NOTIFY message, and this SIP NOTIFY message will now be described in detail with reference to FIGS. 5A and 5B.

FIGS. 5A and 5B are diagrams of SIP NOTIFY messages, according to an embodiment of the present invention.

The SIP NOTIFY message is one of SIP extension methods and, is used to notify a remote entity about a status change. Similar to the SIP SUBSCRIBE message, the SIP NOTIFY message also includes an event header, and this event header includes parameters defined by a predetermined event package.

Referring to FIGS. 5A and 5B, the SIP NOTIFY messages according to the current embodiment include event headers 50 and 53 which provide information about one or more service providers.

Referring to FIG. 5A, the event header 50 of the SIP NOTIFY message including requesting the information about the one or more service providers may be expressed according to a conventional event package. The event header 50 may be expressed according to an ua-profile event package that is a conventional event package. A plurality of parameters related to a discovery of the one or more service providers are added to extend the ua-profile event package, and the event header 50 providing the information about the one or more service providers according to the extended ua-profile event package may be expressed.

A "ua-profile" parameter indicates that the event header 50 is expressed according to the ua-profile event package.

A "profile-type" parameter indicates a type of profile, wherein the second entity 21 provides the profile to the first entity 20.

Profile-type="application=oif-spdlists-request" indicates that the second entity 21 provides the information about the one or more service providers to the first entity 20.

A "version" parameter indicates a version of the information about the one or more service providers. The first entity 20 may check the "version" parameter, thereby determining whether the information about the one or more service providers has been updated.

"cursection" and "lastsection" parameters are used in the case where the information about the one or more service providers is divided and then transmitted to the first entity 20. The "lastsection" parameter indicates the number of divided sections, and the "cursection" parameter indicates a current section position from among the divided sections. In the case of lastsection="10" and cursection="1", the second entity 21 has nine more sections to provide to the first entity 20 until the second entity 21 completes providing all of the information about the one or more service providers.

A Content-Encoding header 51 is a header corresponding to the Accept-Encoding header 31 in FIG. 3A, and indicates an encoding format used to encode the information about the one or more service providers. In the case of Content-Encoding: gzip, the information about the one or more service providers has been encoded by using an XML document compression format referred to as "gzip".

A "Content-Type" header 52 indicates a type of a body of the SIP NOTIFY message. In the case of Content-Type: application/oiptvf-iptvSPdicovery+xml, the body of the SIP NOTIFY message includes the information about the one or more service providers.

Referring to FIG. 5B, the event header 53 of a SIP NOTIFY message including information about one or more service providers is expressed according to a separate event package defined to express an event header providing the information about the one or more service providers.

An "oif-spdlist" parameter indicates that the event header 53 is expressed according to an oif-spdlist event package that is a new event package.

Bodies of the SIP NOTIFY messages of FIGS. 5A and 5B include the information about the one or more service providers. As described above in relation to FIG. 1, the information about the one or more service providers may include information about a URI regarding a service discovering entity, information about a protocol required when information about services is transmitted and received, and information related to a UI, such as logos, trademarks, or icons, which are of the one or more service providers.

FIGS. 6A and 6B are diagrams of SIP NOTIFY messages, according to an embodiment of the present invention.

Referring to FIG. 6A, an event header of the SIP NOTIFY message including information about one or more services may be expressed according to a conventional event package. Although some parameters in the embodiment of FIG. 6A are different from those in the embodiment of FIG. 5A, the event header of the SIP NOTIFY message is expressed according to an event package extended from the ua-profile event package that is the conventional event package, which is the same as the embodiment of FIG. 5A. A "payload" parameter indicates a type of a service in service information included in a body of the SIP NOTIFY message. For example, in the case of payload="02", the service information about a linear TV may be included in the body, and in the case of payload="03", the service information about Video on Demand (VOD) may be included in the body.

Referring to FIG. 6B, an event header of the SIP NOTIFY message including information about one or more service providers is expressed according to a separate event package defined to express an event header providing the information about the one or more service providers. That is, a header of the SIP NOTIFY message including the information about the one or more service providers is expressed according to an oif-spdlist event package that is the newly defined event package.

Referring back to FIG. 2, when the second SIP message corresponding to one of those illustrated in FIGS. 5A, 5B, 6A, and 6B is generated in operation 230, the second entity 21 transmits the second SIP message to the first entity 20 in operation 240.

The first entity 20 receives the second SIP message in operation 240, and then performs a discovering operation according to the information about the one or more service providers or the information about the one or more services. By doing so, the first entity 20 may select a service provider from among the one or more service providers, or may select a service from among the one or more services.

FIG. 7 is a flowchart of a method of searching for information about a service provider, according to another embodiment of the present invention.

FIG. 7 corresponds to a case in which an ITF entity 71 using an IPTV service receives information about one or more IPTV service providers from an IPTV service discovering entity 74. As described above in relation to FIG. 1, the ITF entity 71 may include a plurality of entities corresponding to domains of users, and in this regard, the ITF entity 71 of the embodiment of FIG. 7 includes an Open IPTV Terminal Functional Entity (OITF entity) 72 and an IP Multimedia Subsystem (IMS) Gateway Functional Entity (IG entity) 73. The OITF entity 72 and the IG entity 73 are entities of user domains following an Open IPTV forum architecture.

The OITF entity 72 accesses an IPTV service via gateways of the user domains, such as Application Gateway Functional Entity (AG entity), an IMS Gateway Functional Entity (IG entity), and the like. A device finally using the IPTV service may be the OITF entity 72.

The IG entity 73 allows the OITF entity 72 to access the IPTV service according to an IMS core network. That is, the IG entity 73 relays between the OITF entity 72 and network domain entities such as an IPTV service provider discovering entity and an IPTV service discovering entity, thereby enabling the OITF entity 72 to access the IPTV service. The IG entity 73 is an entity that generates a first SIP message requesting information about service providers or information about services, and may correspond to the first entity 20 of the embodiment of FIG. 2.

The IPTV service provider discovering entity 74 and an Authentication and Session Management (ASM) entity 75 are network domain entities managed by an IPTV service provider or a network provider.

The IPTV service provider discovering entity 74 is an entity that generates a second SIP message including information about one or more service providers, and may correspond to the second entity 21 of the embodiment of FIG. 2.

The ASM entity 75 is required by a managed network model from among IPTV service models according to the Open IPTV forum architecture. The ASM entity 75 involves access management and IPTV service session management, thereby enabling only a specific user to access a management network.

Referring to FIG. 7, in operation 710, the OITF entity 72 transmits a message requesting information about one or more IPTV service providers to the IG entity 73. The OITF entity 72 and the IG entity 73 are user domain entities which exchange messages generated by using a predetermined message format specified between the OITF entity 72 and the IG entity 73. In FIG. 7, the OITF entity 72 transmits a Hypertext Transfer Protocol (HTTP) request message to the IG entity 73.

In operation 712, the IG entity 73 generates a first SIP message according to the request message received in operation 710, and transmits the first SIP message to the ASM entity 75. The first SIP message is aimed to be transmitted to the IPTV service provider discovering entity 74. However, in the managed network model, since the ASM entity 75 manages IPTV service session, the first SIP message is transmitted to the IPTV service provider discovering entity 74 via the ASM entity 75. The first SIP message may be the SIP SUBSCRIBE message previously described with reference to FIGS. 3A and 3B.

In operation 714, the ASM entity 75 transmits the first SIP message, which is received from the IG entity 73 in operation 712, to the IPTV service provider discovering entity 74.

In operation 716, the IPTV service provider discovering entity 74 transmits a SIP 200 OK message to the ASM entity 75, wherein the SIP 200 OK message indicates that the first SIP message has been normally received in operation 714.

In operation 718, the ASM entity 75 transmits the SIP 200 OK message received in operation 716 to the IG entity 73.

In operation 720, the IPTV service provider discovering entity 74 transmits a second SIP message including information about one or more service providers to the ASM entity 75. The second SIP message may be the SIP NOTIFY message previously described with reference to FIGS. 5A and 5B.

In operation 722, the ASM entity 75 transmits the second SIP message received from the IPTV service provider discovering entity 74 in operation 720 to the IG entity 73.

In operation 724, the IG entity 73 transmits a SIP 200 OK message to the ASM entity 75, wherein the SIP 200 OK message indicates that the second SIP message has been normally received in operation 722.

In operation 726, the ASM entity 75 transmits the SIP 200 OK message received in operation 724 to the IPTV service provider discovering entity 74.

In operation 728, the IG entity 73 transmits a response message including information about one or more service providers to the OITF entity 72. The IG entity 73 generates the response message including the information about the one or more service providers by using the predetermined message format specified between the OITF entity 72 and the IG entity 73, and transmits the generated response message to the OITF entity 72.

Figure 8:
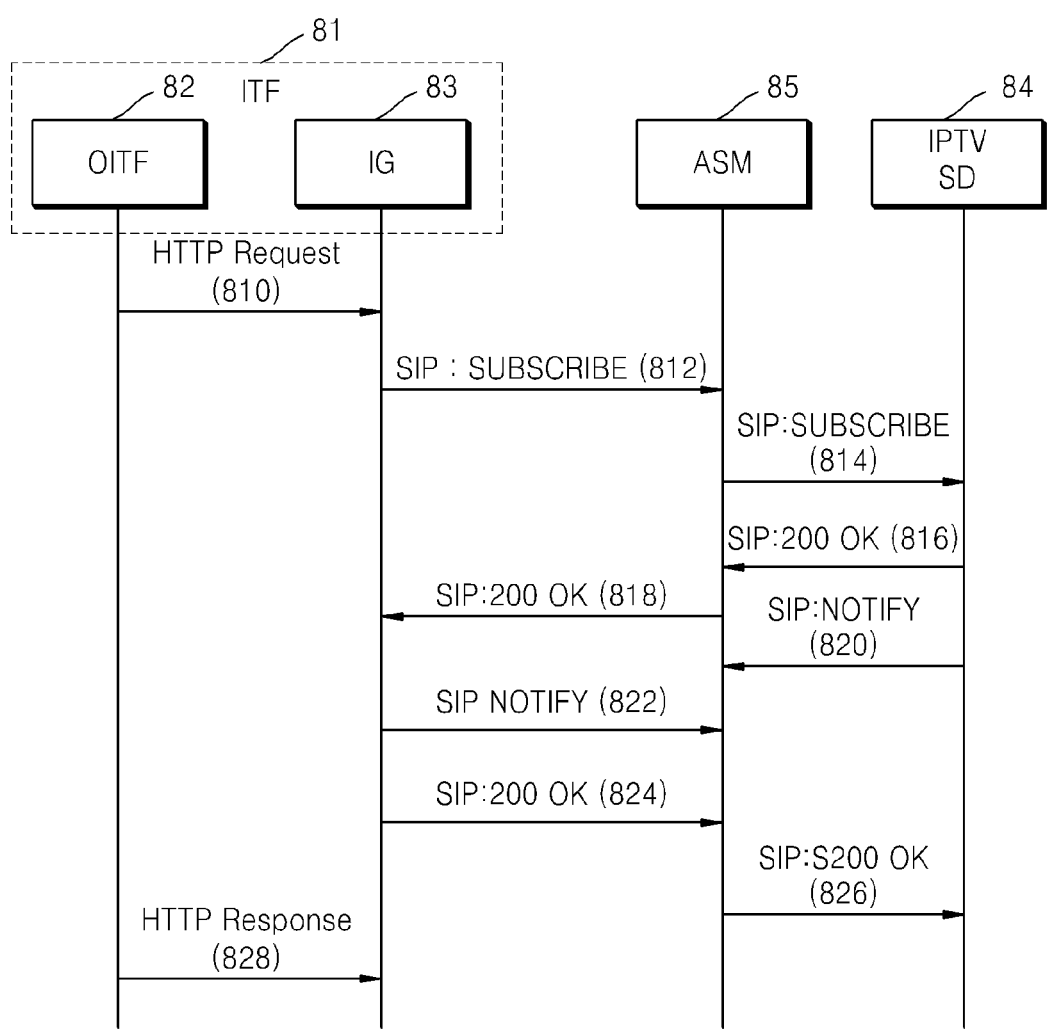
FIG. 8 is a flowchart of a method of searching for information about a service, according to another embodiment of the present invention.

FIG. 8 is a flowchart of a method of searching for information about a service, according to another embodiment of the present invention.

The method of searching for the information about the service according to the embodiment of FIG. 8 is the same as the method of searching for the information about the service provider according to the embodiment of FIG. 7, except that the method of FIG. 8 involves searching for information about IPTV services by accessing an IPTV service discovering entity 84.

Thus, an IG entity 83 is an entity that generates a first SIP message requesting information about service providers or information about services, and may correspond to the first entity 20 of the embodiment of FIG. 2.

The IPTV service discovering entity 84 is an entity that generates a second SIP message including information about one or more services provided from predetermined service providers, and may correspond to the second entity 21 of the embodiment of FIG. 2.

In operation 810, an OITF entity 82 transmits a message requesting information about IPTV services to the IG entity 83. The OITF entity 82 and the IG entity 83 are user domain entities which exchange messages generated by using a predetermined message format specified between the OITF entity 82 and the IG entity 83. In FIG. 8, the OITF entity 82 transmits a HTTP request message to the IG entity 83.

In operation 812, the IG entity 83 generates a first SIP message according to the request message received in operation 810, and transmits the first SIP message to an ASM entity 85. The first SIP message may be the SIP SUBSCRIBE message previously described with reference to FIGS. 4A and 4B.

In operation 814, the ASM entity 85 transmits the first SIP message, which is received from the IG entity 83 in operation 812, to the IPTV service discovering entity 84.

In operation 816, the IPTV service discovering entity 84 transmits a SIP 200 OK message to the ASM entity 85, wherein the SIP 200 OK message indicates that the first SIP message has been normally received in operation 814.

In operation 818, the ASM entity 85 transmits the SIP 200 OK message received in operation 816 to the IG entity 83.

In operation 820, the IPTV service discovering entity 84 transmits a second SIP message including information about one or more services to the ASM entity 85. The second SIP message may be the SIP NOTIFY message previously described with reference to FIGS. 6A and 6B.

In operation 822, the ASM entity 85 transmits the second SIP message received from the IPTV service discovering entity 84 in operation 820 to the IG entity 83.

In operation 824, the IG entity 83 transmits a SIP 200 OK message to the ASM entity 85, wherein the SIP 200 OK message indicates that the second SIP message has been normally received in operation 822.

In operation 826, the ASM entity 85 transmits the SIP 200 OK message received in operation 824 to the IPTV service discovering entity 84.

In operation 828, the IG entity 83 transmits a response message including information about one or more services to the OITF entity 82. The IG entity 83 generates the response message including the information about the one or more services by using the predetermined message format specified between the OITF entity 82 and the IG entity 83, and transmits the generated response message to the OITF entity 82. Referring to FIG. 8, the IG entity 83 transmits a HTTP response message to the OITF entity 82.

Figure 9:
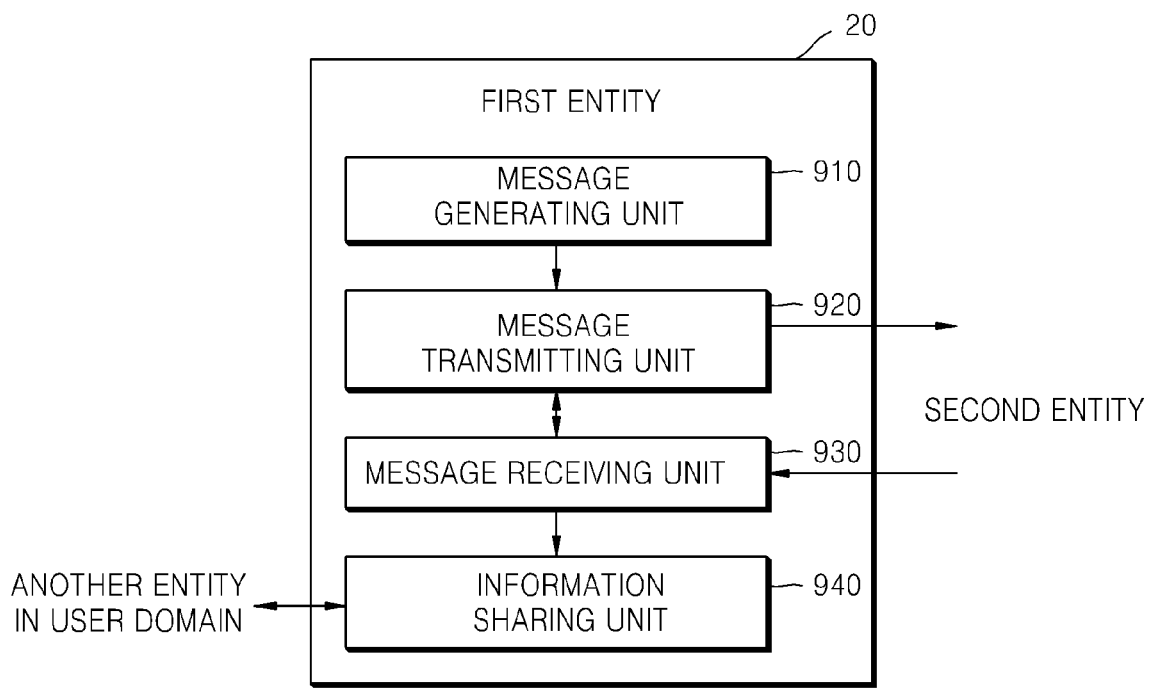
FIG. 9 is a diagram of a first entity, according to an embodiment of the present invention.

FIG. 9 is a diagram of a first entity 20, according to an embodiment of the present invention.

Referring to FIG. 9, the first entity 20 according to the embodiment of FIG. 9 includes a message generating unit 910, a message transmitting unit 920, a message receiving unit 930, and an information sharing unit 940. As described above, the first entity 20 may be an entity corresponding to one of the IG entities 73 and 83 of FIGS. 7 and 8.

The message generating unit 910 generates a first SIP message requesting transmission of information about one or more service providers or information about one or more services. The first SIP message requesting the information about the one or more service providers is previously described with reference to FIGS. 3A and 3B, and the first SIP message requesting the information about the one or more services is previously described with reference to FIGS. 4A and 4B.

The message transmitting unit 920 transmits the first SIP message generated by the message generating unit 910 to a second entity 21. As described above, the second entity 21 may be an entity corresponding to one of the IPTV service provider discovering entity 74 of FIG. 7 and the IPTV service discovering entity 84 of FIG. 8. Thus, the first SIP message may be passed through a third entity such as ASM entities 75 and 85 of FIGS. 7 and 8, and then transmitted to the second entity 21.

The message receiving unit 930 receives a second SIP message that is transmitted from the second entity 21 as a response to the first SIP message transmitted from the message transmitting unit 920, and that includes the information about one or more service providers or the information about one or more services. The second SIP message including the information about one or more service providers is previously described with reference to FIGS. 5A and 5B, and the second SIP message including the information about one or more services is previously described with reference to FIGS. 6A and 6B. Similar to the transmission of the first SIP message, the second SIP message may also be passed through a third entity such as the ASM entities 75 and 85 of FIGS. 7 and 8, and then received by the message receiving unit 930. Also, the message receiving unit 930 may receive a SIP 200 OK message from the second entity 21, wherein the SIP 200 OK message is a SIP message indicating that second entity 21 has normally received the first SIP message transmitted from the message transmitting unit 920. Similarly, as a response to the first SIP message, the message transmitting unit 920 may transmit a SIP 200 OK message to the second entity 21, wherein the SIP 200 OK message indicates that the message receiving unit 930 has normally received the second SIP message transmitted from the second entity 21.

The information sharing unit 940 shares the information about one or more service providers or the information about one or more services with another entity in a user domain, wherein the information is included in a message_received by the message receiving unit 930. For example, the information sharing unit 940 shares the information included in a message body of the second SIP message with the other entity such as one of the OITF entities 72 and 82 in the user domain. By transmitting a HTTP response message generated by using a predetermined message format, such as HTTP, which is specified for information exchange between entities of the user domain to the other entity, the information about one or more service providers or the information about one or more services may be shared with the other entity.

Figure 10:
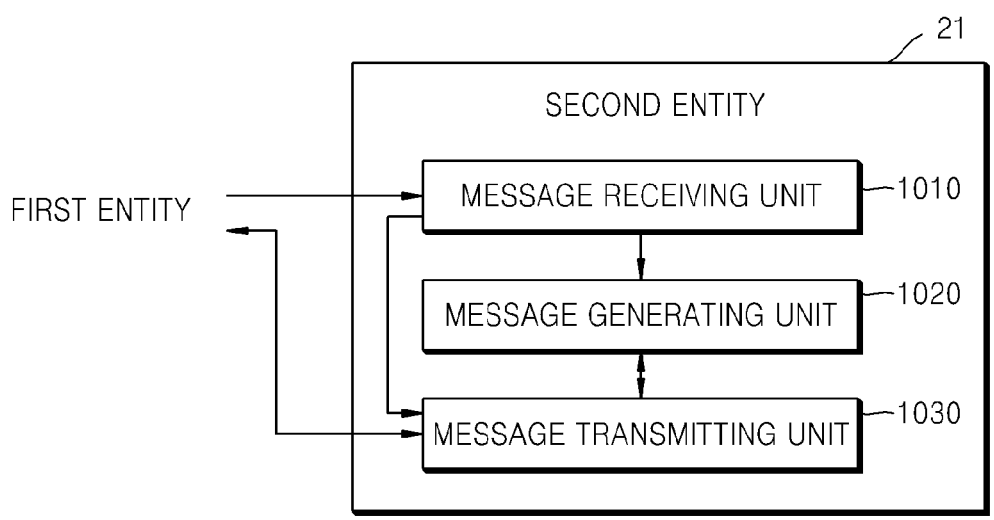
FIG. 10 is a diagram of a second entity, according to an embodiment of the present invention.

FIG. 10 is a diagram of a second entity 21, according to an embodiment of the present invention.

Referring to FIG. 10, the second entity 21 according to the embodiment of FIG. 10 includes a message receiving unit 1010, a message generating unit 1020, and a message transmitting unit 1030. As described above, the second entity 21 may be an entity corresponding to one of the IPTV service provider discovering entity 74 of FIG. 7 and the IPTV service discovering entity 84 of FIG. 8.

The message receiving unit 1010 receives the first SIP message, which requests the information about one or more service providers or the information about one or more services, and which is transmitted from the message transmitting unit 920, from the first entity 20. The message receiving unit 1010 may receive the first SIP message directly from the first entity 20, or may receive the first SIP message via the third entity such as the ASM entities 75 and 85 of FIGS. 7 and 8.

The message generating unit 1020 generates a second SIP message including the information about one or more service providers or the information about one or more services, as a response to the first SIP message received by the message receiving unit 1010.

The message transmitting unit 1030 transmits the second SIP message generated by the message generating unit 1020 to the second entity 21. Similar to reception of the first SIP message, the second SIP message may be transmitted to the first entity 20 via the third entity such as the ASM entities 75 and 85 of FIGS. 7 and 8. Also, before transmitting the second SIP message, the message transmitting unit 1030 may transmit a SIP 200 OK message indicating that the first SIP message has been normally received to the first entity 20.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. Carrier waves (e.g., transmission through the Internet) containing at least one of the embodiments of the present invention may be temporarily or permanently stored in the computer readable recording medium. The computer readable recording medium can also be distributed over network coupled computer systems so that the computer readable code is stored and executed in a distributed fashion.

While this invention has been particularly shown and described with reference to exemplary embodiments thereof, it will be understood by those of ordinary skill in the art that various changes in form and details may be made therein without departing from the spirit and scope of the invention as defined by the appended claims.

For example, an information receiving apparatus of a first entity receiving information about one or more service providers from a second entity according to an exemplary embodiment of the present invention can comprise a bus coupling each unit of the apparatus as shown in FIGS. 9 and 10, at least one processor coupled to the bus, a memory coupled to the bus to store instructions, received message or generated message, and to the at least one processor to execute instructions as described earlier.

The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A computer implemented method of receiving information about one or more service providers in a network comprising a first entity and a second entity, the method comprising:

generating, by the first entity, a first Session Initiation Protocol (SIP) message for performing a service provider discovery of one or more service providers providing a service;

transmitting the first SIP message to the second entity;

in response to the first SIP message, receiving, by the first entity, a second SIP message including information about the one or more service providers from the second entity, wherein the service comprises an Internet Protocol Television (IPTV) service;

wherein the first SIP message comprises a SIP SUBSCRIBE message requesting information about one or more IPTV service providers, wherein the second SIP message comprises a SIP NOTIFY message comprising information about one or more IPTV service providers, wherein the SIP SUBSCRIBE message comprises a first header requesting the information about the one or more IPTV service providers providing the service, wherein the SIP NOTIFY message comprises a second header for providing the information about the one or more IPTV service providers providing the service.

2. The method of claim 1, wherein the first header and the second header are expressed according to a ua-profile event package.

3. The method of claim 2, wherein the first header comprises information about a domain address of a service provider that the first entity desires to receive a service from.

4. The method of claim 1, wherein the first header is expressed according to a separate event package defined to express the first header requesting the information about the one or more IPTV service providers.

5. The method of claim 1, wherein the transmitting of the first SIP message further comprises receiving a SIP 200 OK message from the second entity, wherein the SIP 200 OK message indicates that the first SIP message has been received.

6. The method of claim 1, wherein the SIP NOTIFY message comprises Uniform Resource Identifier (URI) information about an entity capable of discovering one or more services provided from a service provider.

7. The method of claim 1, wherein the SIP NOTIFY message comprises information about at least one from among a protocol and an icon which are used when discovering the one or more services provided from the service provider.

8. The method of claim 1, wherein the second header is expressed according to a separate event package defined to express the second header for providing the information about the one or more IPTV service providers.

9. The method of claim 1, wherein the receiving of the second SIP message further comprises transmitting a SIP 200 OK message to the second entity, wherein the SIP 200 OK message indicates that the second SIP message has been received.

10. A method of providing information about one or more service providers to a first entity, wherein the providing is performed by a second entity, the method comprising:

receiving a first SIP message, from the first entity, for performing a service provider discovery of one or more service providers providing a service;

in response to the first SIP message, generating a second SIP message comprising information about the one or more service providers;

transmitting the second SIP message to the first entity;

wherein the service comprises an Internet Protocol Television (IPTV) service, wherein the first SIP message comprises a SIP SUBSCRIBE message requesting information about one or more IPTV service providers;

wherein the second SIP message comprises a SIP NOTIFY message comprising information about one or more IPTV service providers, wherein the SIP SUBSCRIBE message comprises a first header requesting the information about the one or more IPTV service providers, and wherein the SIP NOTIFY message comprises a second header for providing the information about the one or more IPTV service providers.

11. The method of claim 10, wherein the first header and second header are expressed according to a ua-profile event package.

12. The method of claim 11, wherein the first header comprises information about a domain address of a service provider that the first entity desires to receive a service from.

13. The method of claim 10, wherein the first header is expressed according to a separate event package defined to express the first header requesting the information about the one or more IPTV service providers.

14. The method of claim 10, wherein the receiving of the first SIP message further comprises transmitting a SIP 200 OK message to the first entity, wherein the SIP 200 OK message indicates that the first SIP message has been received.

15. The method of claim 11, wherein the SIP NOTIFY message comprises URI information about an entity capable of discovering one or more services provided from a service provider.

16. The method of claim 11, wherein the SIP NOTIFY message comprises information about at least one from among a protocol and an icon which are used when discovering the one or more services provided from the service provider.

17. The method of claim 10, wherein the second header is expressed according to a separate event package defined to express the second header for providing the information about the one or more IPTV service providers.

18. The method of claim 10, wherein the transmitting of the second SIP message further comprises receiving a SIP 200 OK message from the first entity, wherein the SIP 200 OK message indicates that the second SIP message has been received.

19. An information receiving apparatus for receiving information about one or more service providers in a network comprising a first entity and a second entity, the information receiving apparatus comprising:

a message generating unit generating a first SIP message for performing a service provider discovery of one or more service providers providing a service;

a message transmitting unit transmitting the first SIP message to the second entity; and a message receiving unit receiving a second SIP message comprising information about the one or more service providers from the second entity, in response to the first SIP message, wherein the service comprises an Internet Protocol Television (IPTV) service, wherein the first SIP message comprises a SIP SUBSCRIBE message requesting information about one or more IPTV service providers, wherein the second SIP message comprises a SIP NOTIFY message comprising information about one or more IPTV service providers, wherein the SIP SUBSCRIBE message comprises a first header requesting the information about the one or more IPTV service providers, and wherein the SIP NOTIFY message comprises a second header for providing the information about the one or more IPTV service providers.

20. An information providing apparatus for providing information about one or more service providers in a network comprising a first entity and a second entity, the information providing apparatus comprising:

a message receiving unit receiving a first SIP message for performing a service provider discovery of one or more service providers providing a service a message generating unit generating a second SIP message comprising information about the one or more service providers, as a response to the first SIP message a message transmitting unit transmitting the second SIP message wherein the service comprises an Internet Protocol Television (IPTV) service, wherein the first SIP message comprises a SIP SUBSCRIBE message requesting information about one or more IPTV service providers, wherein the second SIP message comprises a SIP NOTIFY message comprising information about one or more IPTV service providers, wherein the SIP SUBSCRIBE message comprises a first header requesting the information about the one or more IPTV service providers, and wherein the SIP NOTIFY message comprises a second header for providing the information about the one or more IPTV service providers.

21. A non-transitory computer readable recording medium having recorded thereon a program for executing the method of claim 1.

22. A non-transitory computer readable recording medium having recorded thereon a program for executing the method of claim 10.

23. The method of claim 10, further comprising:
receiving, from the first entity, a third SIP message for performing a service discovery to a service discovering entity of the service provider according to information about the service provider included in the second SIP message;
in response to the third SIP message, generating a fourth SIP message including the information about the service from the service discovering entity; and
transmitting the fourth SIP message to the first entity.

24. The method of claim 1, further comprising: receiving, from the first entity, a third SIP message for performing a service discovery to a service discovering entity of the service provider according to information about the service provider included in the second SIP message; in response to the third SIP message, generating a fourth SIP message including the information about the service from the service discovering entity; and transmitting the fourth SIP message to the first entity.

25. The method of claim 24, the third SIP message comprises another SIP SUBSCRIBE message for performing the service discovery.

* * * * *